(12) United States Patent
Doh et al.

(10) Patent No.: US 8,523,254 B2
(45) Date of Patent: Sep. 3, 2013

(54) ROBOT HAND WITH CONNECTION UNIT THAT UNDERGOES STRETCHING DEFORMATION ACCORDING TO OBJECT SHAPE AND METHOD FOR CONTROLLING ROBOT HAND

(75) Inventors: Nak Ju Doh, Gyeonggi-do (KR); Jingfu Jin, Jilin (CN); Chang Joo Nam, Seoul (KR); Young Hoon Lee, Gyeonggi-do (KR); Shang Li Yuen, Seoul (KR); Chang Hyun Jun, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 24 days.

(21) Appl. No.: 13/123,706

(22) PCT Filed: Jul. 17, 2009

(86) PCT No.: PCT/KR2009/003951
§ 371 (c)(1),
(2), (4) Date: Jun. 29, 2011

(87) PCT Pub. No.: WO2010/053245
PCT Pub. Date: May 14, 2010

(65) Prior Publication Data
US 2011/0254303 A1    Oct. 20, 2011

(30) Foreign Application Priority Data

Nov. 6, 2008    (KR) .................. 10-2008-0109807

(51) Int. Cl.
*B66C 1/42*    (2006.01)
(52) U.S. Cl.
USPC .................... 294/119.2; 294/119.3; 294/213; 901/31; 414/729

(58) Field of Classification Search
USPC .................. 294/119.2, 119.3, 111, 99.1, 100, 294/86.4, 213, 2; 901/30, 31, 37, 38, 39; 414/729
See application file for complete search history.

(56) References Cited

U.S. PATENT DOCUMENTS

| 889,699 | A | * | 6/1908 | Lipscomb | 294/68.23 |
| 4,350,381 | A | * | 9/1982 | Hellmann | 294/208 |
| 4,355,936 | A | * | 10/1982 | Thomas et al. | 414/796.2 |
| 4,367,891 | A | * | 1/1983 | Wauer et al. | 294/197 |
| 4,715,638 | A | * | 12/1987 | Chambers | 294/198 |
| 5,588,688 | A | * | 12/1996 | Jacobsen et al. | 294/106 |
| 2008/0272259 | A1 | * | 11/2008 | Zavattieri et al. | 248/311.2 |

FOREIGN PATENT DOCUMENTS

| EP | 0891841 A1 | 1/1999 |
| EP | 1408241 | 4/2004 |

(Continued)

*Primary Examiner* — Saul Rodriguez
*Assistant Examiner* — Gabriela Puig
(74) *Attorney, Agent, or Firm* — Rabin & Berdo, P.C.

(57) ABSTRACT

A robot hand with a connection part that undergoes stretching deformation according to object shape. The robot hand includes a variable connection device that provides a contact face that enables pressing and contacting a moving target and has a connection part in contact with the moving target enables stretching deformation; a connection length controller that interfaces with a drive part to stretch and deform the connection part so that the connection part undergoes conversion between a closed-loop state wherein it is continuous with the surface of the moving target or divided into a plurality of sections to be pressed and contacted, and an open-loop state wherein it detaches from the moving target; and a shape retention device that retains the shape of the variable connection device consistently in a closed-loop state wherein the variable connection device is pressed and contacted with the moving target at a set pressure.

42 Claims, 10 Drawing Sheets

(56) References Cited

FOREIGN PATENT DOCUMENTS

| KR | 2001-0108960 | | 12/2001 |
| KR | 10-0511202 | A | 8/2005 |
| KR | 2006-0124103 | A | 12/2006 |
| WO | WO-99-48651 | A1 | 9/1999 |

\* cited by examiner

ROBOT HAND WITH CONNECTION UNIT THAT UNDERGOES STRETCHING DEFORMATION ACCORDING TO OBJECT SHAPE AND METHOD FOR CONTROLLING ROBOT HAND

TECHNICAL FIELD

The present invention relate to a robot hand with a connection unit that is stretchably deformed in conformity with the shape an object and a method for controlling the same, and particularly to, such a robot hand with a connection unit that is stretchably deformed in conformity with the shape of an object and a method for controlling the same, in which the connection unit can be pressurizingly brought into contact with an object to be moved or transferred (hereinafter, referred to as "to-be-moved object") at a preset pressure suitable for the transfer of the to-be-moved object while stretchably deforming the connection unit to adapt to the object shape.

BACKGROUND ART

In general, the operations performed by the human hands can be broadly classified based on a control viewpoint and an implementation viewpoint. From the control viewpoint, the human hand operation is divided into a tip grasping operation in which a human grasps an object using his or her finger tips, such as grasping a pen in one hand to write, a whole or power grasping operation in which the human grasps an object using his or her whole palm or all fingers, and an operation in which the human maintains a state of being in contact with an object without grasping it such as pushing it.

From the implementation viewpoint, the human hand operation is divided into an operation in which a human hand acts as a medium of transmitting a force to an object, such as grasping and turning a doorknob, grasping and pivoting about a horizontal bar, or pushing a heavy object, a pick and move operation in which the human picks up and moves an object, such as picking up a cup or beaker and transferring it to another place, moving a keychain or the like with a finger hooked on it, or sweeping coins or the like in a hand, and a precise task in which the human uses his or her hands precisely, such as grasping a pen in one hand to write or draw, or manipulating a complicated Rubik's cube or the like.

The human hands have a considerably complicated structure that consists of a plurality of joints, and bones and muscles for moving the joints. In addition, the human hands are surrounded by sensitive nervous tissues that can sense haptic sensation, temperature, pressure, and the like. Both hands of the human are composed of 54 bones, which correspond to 25% of a total of 206 bones in the human body. Moreover, the human hands include so extremely complicated tissues as to control 30% of regions that take charge of the motor nerves of a brain.

Besides, in the case where the human performs a manual operation, various items of information acquired from the internal sensors of the human hands and the external sensors like the human eyes are directly feedback to the brain, which in turns correctly analyzes the sensor information items and determines the current status based on the currently inputted sensor information as well as empirical knowledge accumulated in the growth process in the past.

The human brain can perform, in real-time, a multiple-path planning regarding how to operate 54 bones based on the analyzed sensor information, and can calculate a multi-control input for a muscular force and a degree of motion of muscles needed to perform the multiple-path planning so that the human can excellently perform a variety of types of manual operations in association with the functions such as determination, storage and calculation of the brain A conventional robot hand, which is a human-like robot hand that creates a robotic imitation of the human hand, is developed and manufactured. Such a conventional robot hand, however, entails a problem in that a driver such as a motor or a pump and a sensor is relatively difficult to install in terms of space efficiency and balance as compared to the installation of the human hands as mentioned above, in that the performance of the driver or the sensor itself is greatly degraded as compared to that of the human, and in that it is substantially impossible to analyze and process information acquired through the sensor to simultaneously control about 20 joints using a proper force and path.

Despite the above-mentioned problem, the human-like robot hand is aimed at replacing all the operations performed by the human, so that although the robot hand itself has a complex shape, it does not perform various operations other than a basic operation of manipulating an object having a predetermined specific shape. In addition, the conventional robot hand is advantageous in that the rate of success of a repeated operation is low even in some executable operations and stability of gripping force, transmission and formation is poor, which makes it difficult to be put into practical use.

Since the development of a robot hand structure that imitates the human hand as it is requires a long-term approach, there is a need for the development of a robot hand for exclusive purpose of performing a specific work, which can reliably and stably perform even some limited operations but not all the operations performed by the human to promote commercialization of the robot.

DISCLOSURE OF INVENTION

Technical Problem

Accordingly, the present invention has been made in order to satisfy the above-mentioned necessities, and it is an object of the present invention to provide a robot hand with a connection unit that is stretchably deformed in conformity with the shape of an object, the robot hand having a structure that can reliably and stably perform a pick and move operation of picking up and moving an object such as enveloping, hooking, and sweeping, among various operations performed by the human hands, and a method for controlling the same.

Technical Solution

To achieve the above objects, in one aspect, the present invention provides a robot hand with a connection unit that is stretchably deformed in conformity with the shape of an object, the robot hand including: a variable connection device 100 including a connection unit 100a configured to provide a contact face that can be brought into pressurizing contact with a to-be-moved object 10 and configured to be stretchably deformed so as to be in close contact with the to-be-moved object 10; a connection length controller 200 configured to be operated in cooperation with a driving unit such as a motor 201 or a pump to stretchably deform the connection unit 100a of the variable connection device so that the connection unit 100a of the variable connection device undergoes a switch between a closed-loop state in which the connection unit 100a is brought into pressurizing contact with an outer surface of the to-be-moved object 10 either continuously or divided into a plurality of segments, and an open-loop state in which the connection unit 100a is separated from the to-be-moved object 10; and a shape retention device configured to constantly retain the shape of the variable connection device 100 in the closed-loop state in which the variable connection device 100 is brought into pressurizing contact with the to-be-moved object 10 at a preset pressure.

Preferably, the variable connection device 100 includes a bending deformation unit 110 consisting of a linear member such as a chain, a belt, or a wire, which can be flexibly deformed in its length and bending shape.

Also, preferably, the variable connection device 100 further includes an airbag unit 130 formed of a tubular member that is flexibly adjustable in volume by injection and discharge of air, and configured to be connectedly mounted on the bending deformation unit 110 so as to extend along the longitudinal direction of the bending deformation unit 110.

In addition, preferably, the variable connection device 100 includes a hand unit 120 configured to allow the connection unit 100a to vary in length by its position movement in the direction in which the hand unit approaches or moves away from the to-be-moved object in a state of constantly retain the shape thereof unlike the robot hand according to the first embodiment of the present invention.

Besides, the variable connection device 100 further includes a bending deformation unit 110 consisting of a linear member such as a chain, a belt, or a wire, which can be flexibly deformed in its length and bending shape, and coupled to at one end thereof to a front end of the hand unit 120 so as to vary in the contact state of the bending deformation unit 110 with the to-be-moved object 10 depending on the protruding length or position of the hand unit 120.

Moreover, the variable connection device 100 includes an airbag unit 130 formed of a tubular member that is flexibly adjustable in volume by injection and discharge of air.

In addition, preferably, the connection length control device 200 includes: a first gear 211 rotatably mounted at one side of the bending deformation unit 110 in such a fashion as to be in close contact with the bending deformation unit 110, the first gear being configured to deforms the length or shape of the bending deformation unit 110 while moving one side of the bending deformation unit 110 by the rotation thereof; a second gear 212 rotatably mounted at the other side of the bending deformation unit 110 in such a fashion as to be in close contact with the bending deformation unit 110, the second gear being configured to be rotated in the opposite direction to that of the first gear 211 and to deform the length or shape of the bending deformation unit 110 while moving the other side of the bending deformation unit 110 together with the first gear 211; and a power transmission assembly 213 configured to simultaneously drive the first gear 211 and the second gear 212 in the opposite direction by the rotation of the motor 201 in one direction.

Further, preferably, the power transmission assembly 213 includes: a first main pulley 213a mounted coaxially with the first gear 211 and connected to the motor 201 by a belt member so as to be rotated in the same direction as the rotation direction of the motor 201; a second main pulley 213b mounted coaxially with the second gear 212; a first auxiliary pulley 213c connected to the second main pulley 213b by a belt member so as to be rotated in the same direction as the rotation direction of the second main pulley 213b; a second auxiliary pulley 213d connected to the motor 201 by a belt member so as to be rotated in the same direction as the rotation direction of the motor 201; and a pair of direction conversion pulleys 213e mounted at a position opposed to the second auxiliary pulley 213d in such a fashion as to be connected to the first auxiliary pulley 213c and the second auxiliary pulley 213d by a belt member to cause the rotation of the second auxiliary pulley 213d to be transmitted to the first auxiliary pulley 213c in the reverse direction.

Moreover, preferably, the connection length control device 200 includes a linear-motion transmission unit 220 configured to linearly move the hand unit 120 in the direction in which the hand unit approaches or moves away from the to-be-moved object in association with the motor 201.

Further, preferably, the linear-motion transmission unit 220 includes: a cam member 223 configured to be rotated in association with the motor 201; a linearly movable bar 226 configured to be linkingly connected to the cam member 223 so that a front end of the linearly movable bar 226 is controlled to be forwardly or rearwardly moved by the rotation of the cam member 223 and a pair of left and right hand linkage bars 227 configured to be connected at rear ends thereof to the front end of the linearly movable bar 226 and pivotally coupled at an intermediate portion thereof to one shaft, the left and right hand linkage bars crossing each other at the intermediate portion thereof, so that the front ends of the hand linkage bars vary in its position and angle by the movement of the linearly movable bar 226, the left and right hand linkage bars 227 being connected at the front ends thereof to the hand unit 120.

In addition, preferably, the linear-motion transmission unit 220 further includes: a first power transmission gear 221 configured to be mounted coaxially with the motor 201; a second power transmission gear 222 configured to be connectedly mounted coaxially with the cam member 223 while being in circumferential contact with the first power transmission gear 221 to cause the cam member 223 to deceleratingly or acceleratingly rotate at a speed corresponding to a gear ratio between the first power transmission gear 221 and the second power transmission gear 222; a pair of opposing support 224 vertically extendably mounted at a point where a rear end of the linearly movable bar 226 is positioned, the linearly movable bar 226 being linkingly connected at an intermediate portion thereof to the cam member; and a vertically movable guide 225 to which the rear end of the linearly movable bar 226 is hingedly coupled to cause the rear end of the linearly movable bar 226 to be moved along the supports 224 and which is configured to be horizontally mounted at guide slots of the supports 224 so as to be vertically movable along the guide slots.

Also, preferably, the shape retention device includes a shape retention control unit that controls the operation of the connection length control device 200 so that when the variable connection device 100 is subjected to a load exceeding a threshold value, it is maintained in its finally deformed state.

In addition, preferably, the robot hand further includes a hook device 400 providing a hook that can be hooked on the to-be-moved object 10 using a ring member or a concaved portion groove formed on the to-be-moved object 10 in an open-loop state in which the connection unit 100a of the variable connection device is separated from the to-be-moved object 10.

Also, preferably, the hook device 400 includes a driving force transmission unit 411 configured to receive a pressure applied from the variable connection device 100 and to be controlled in rotation by deformation of the shape and movement of the variable connection device 100, and a hook unit 413 configured to be controlled in movement in the direction in which the hook unit 413 is spaced apart from a rotary shaft 411a of the driving force transmission unit in response to the rotation of the driving force transmission unit 411 and configured to be controlled to be stretched in its length projecting to the to-be-moved object 10. (In addition, preferably, the hook device 400 further includes: a hook linkage unit 412 including a hook engagement unit 412a provided at a point having a constant relative angle to the driving force transmission unit 411 so that the hook unit 413 can be connectedly mounted on the hook engagement unit 412a, the hook unit being mounted on the rotary shaft 411a of the driving force transmission unit 411; and a stretchable support 414 connected to at a top end thereof to the hook engagement unit 412a of the hook linkage unit 412 and including a hook support configured to support a lower end of the hook unit 413 or pressurize an upper end of the hook unit 413 so that the stretchable support 414 is stretchably controlled depending on the position of the hook engagement unit 412a to retain the shape of the hook unit 413 without the hook unit being sagged.

Further, preferably, the hook device 400 comprises: a linear displacement transmission unit 421 connected at a rear end thereof to the linearly movable bar 226 so as to be controlled to be moved in the opposite direction to the movement direction of the variable connection device 100; and a linearly movable hook unit 422 is coupled to a front end of the linear displacement transmission unit 421 so as to be controlled in the protruding length of the linearly movable hook unit 422 to the to-be-moved object 10 by the movement of the linear displacement transmission unit 421.

In another aspect, the present invention provides a method for controlling a robot hand, the method including: a movement method selection step in which whether application of a method of gripping and moving the to-be-moved object 10 is reasonable is determined based on information on the shape of the to-be-moved object 10 acquired through a sensor, or a determination result is inputted through an external input terminal; a closed-loop switching step in which if it is determined in the movement method selection step that the application of a method of gripping and moving the to-be-moved object 10 is reasonable or a determination result is inputted, the operation mode of the robot hand is switched from an open-loop mode to a closed-loop mode in which a connection unit 100a of the variable connection device providing a contact face that can be brought into pressurizing contact with the to-be-moved object 10 comes into pressurizing contact with the surface of the to-be-moved object 10; and a preset pressure gripping step in which if the variable connection device 100 is brought into pressurizing contact with the to-be-moved object 10 at a preset pressure in a state in which the operation mode of the robot hand is switched from the open-loop mode to the closed-loop mode, the shape of the variable connection device 100 is constantly retained.

Preferably, the method further includes an open-loop returning step in which after the to-be-moved object 10 is gripped and is moved to a target position, the operation mode of the robot hand is switched from the closed-loop mode to the open-loop mode in which the connection unit 100a of the variable connection device is controlled to be separated from the to-be-moved object 10.

In another aspect, the present invention provides a method for controlling a robot hand, the method including: a movement method selection step in which whether gripping the to-be-moved object 10 or using a hook is reasonable when moving the to-be-moved object 10 is determined based on information on the shape of the to-be-moved object 10 acquired through a sensor, or a determination result is inputted through an external input terminal; a closed-loop switching step where if it is determined in the movement method selection step that gripping the to-be-moved object 10 is reasonable when moving the to-be-moved object 10 or the determination result is inputted, the operation mode of the robot hand is switched from an open-loop mode to a closed-loop mode in which a connection unit 100a of the variable connection device providing a contact face that can be brought into pressurizing contact with the to-be-moved object 10 comes into pressurizing contact with the surface of the to-be-moved object 10; a preset pressure gripping step in which if the variable connection device 100 is brought into pressurizing contact with the to-be-moved object 10 at a preset pressure in a state in which the operation mode of the robot hand is switched from the open-loop mode to the closed-loop mode, the shape of the variable connection device 100 is constantly retained; an open-loop switching step in which if it is determined in the movement method selection step that using the hook is reasonable when moving the to-be-moved object 10 or the determination result is inputted, the operation mode of the robot hand is switched from the closed-loop mode to the open-loop mode in which the connection unit 100a of the variable connection device providing a contact face that can be brought into pressurizing contact with the to-be-moved object 10 is controlled to be separated from the to-be-moved object 10; and a hook providing step in which a hook is provided so that the hook is hooked on the to-be-moved object 10 using a ring member or a concaved portion groove formed on the to-be-moved object 10 in a state in which the operation mode of the robot hand is switched from the closed-loop mode to the open-loop mode.

Preferably, the hook providing step is performed simultaneously with the operation in which the connection unit 100a of the variable connection device is separated from the to-be-moved object 10.

In addition, preferably, the method further includes a mode returning step in which after the to-be-moved object 10 is moved to a target position with it gripped or with the hook hooked on it, the current operation mode is switched from the open-loop mode to the closed-loop mode, or vice-versa so that the connection unit 100a of the variable connection device or the hook device 400 is separated from the to-be-moved object 10.

Advantageous Effects

The present invention as constructed above has an advantage in that among various operations which are not performed by a conventional robot hand, an operation of gripping the to-be-moved object having an arbitrary shape when moving the to-be-moved object can be reliably and stably implemented by a simple structure including a variable connection device configured to provide a contact face that can be brought into pressurizing contact with the to-be-moved object, a connection length controller configured to stretchably deform the shape of the variable connection device, and a shape retention device configured to constantly maintain the state in which the variable connection device is brought into pressurizing contact with the to-be-moved object at a preset pressure.

In addition, the present invention as constructed above has another advantage in that since the variable connection device has a structure in which the connection unit is stretchably deformed so as to be in close contact with the to-be-moved object, the operation of gripping the object to move the object is enabled only by a minimum control of deforming the length or shape of the variable connection device, so that the operation reliability according to the mechanical driving and the rigidity capable of stably transmitting and maintaining a driving force can be secured.

Further, the present invention as constructed above has yet another advantage in that the compactness and lightness of the robot hand can be implemented by a simpler structure that at least includes only a driving unit and a sensor required to move the to-be-moved object while griping the to-be-moved object. In addition, since the variable connection device of a simple structure is stretchably deformed consistently by the analyzing minimum information inputted from a small quantity of sensors, a control system for operating the sensors and the motor on an association basis can be also simplified, thereby implementing a more stable control system.

EXPLANATION ON REFERENCE NUMERALS OF MAIN ELEMENTS IN THE DRAWINGS

Figure 1:
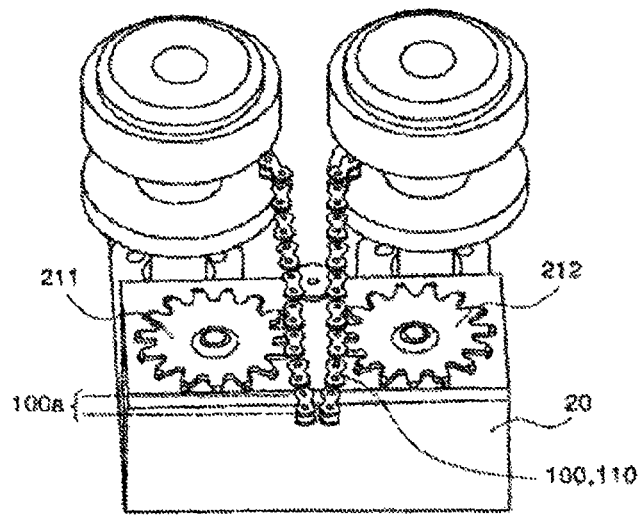
FIG. 1 is a perspective view illustrating essential elements of a robot hand with a connection unit that is stretchably deformed in conformity with the shape of an object according to a first embodiment of the present invention.

10: to-be-moved object
20: housing
100: variable connection device
100$a$: connection unit
110: bending deformation unit
120: hand unit
130: airbag unit
200: connection length control device
201: motor
211: first gear
212: second gear
213: power transmission assembly
213$a$: first main pulley
213$b$: second main pulley
213$c$: first auxiliary pulley
213$d$: second auxiliary pulley
213$e$: direction conversion pulleys
220: linear-motion transmission unit
221: first power transmission gear
222: second power transmission gear
223: cam member
224: support
225: vertically movable guide
226: linearly movable bar
227: hand linkage bar
400: hook device
411: driving force transmission unit
411$a$: rotary shaft
412: hook linkage unit
412$a$: hook engagement unit
413: hook unit
414: stretchable support
421: linear displacement transmission unit
422: linearly movable hook unit

BEST MODE FOR CARRYING OUT THE INVENTION

Now, preferred embodiments of a robot hand with a connection unit that is stretchably deformed in conformity with the shape of an object according to the present invention will be described hereinafter in detail with reference to the accompanying drawings.

The robot hand with a connection unit that is stretchably deformed in conformity with the shape of an object according to the present invention is directed to one which implements a structure which is brought into pressurizing contact with a to-be-moved object 10 and retains the shape of the to-be-moved object at a preset pressure that is suitable for moving the to-be-moved object 10 while stretchably deforming a connection unit 100$a$ to conform to the to-be-moved object 10. The robot hand is largely composed of a variable connection device 100, a connection length control device 200, and a shape retention device (not shown).

The variable connection device 100 is a constituent element that serves to provide a contact face that is brought into pressurizing contact with the to-be-moved object 10, and transmits a driving force transmitted from a driving unit such as a motor 201 or a pump (not shown) to the to-be-moved object 10 in a state of being in close contact with the to-be-moved object 10 to pressurize the to-be-moved object 10. The variable connection device 100 includes a connection unit 100*a* configured to be stretchably deformed so as to be in close contact with the to-be-moved object 10.

The connection length control device 200 serves to be operated in cooperation with a driving unit such as a motor 201 or a pump to stretchably deform the connection unit 100*a* of the variable connection device so that the connection unit 100*a* of the variable connection device undergoes a switch between a closed-loop state in which the connection unit 100*a* is brought into pressurizing contact with an outer surface of the to-be-moved object 10 either continuously or divided into a plurality of segments, and an open-loop state in which the connection unit 100*a* is separated from the to-be-moved object 10.

The shape retention device (not shown) includes a shape retention control unit that controls the operation of the connection length control device 200 so that when the variable connection device 100 is subjected to a load exceeding a threshold value, it is maintained in its finally deformed state so as to constantly retain the shape of the variable connection device 100 in the closed-loop state in which the variable connection device 100 is brought into pressurizing contact with the to-be-moved object 10 at a preset pressure.

Figure 2:
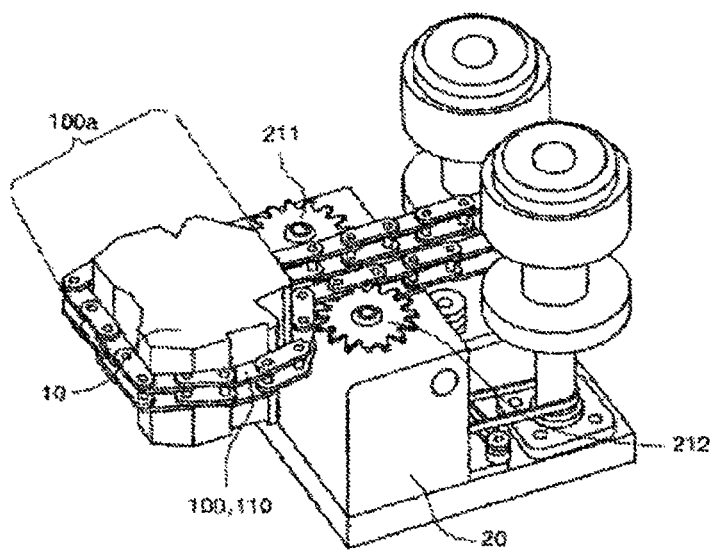
FIG. 2 is a perspective view illustrating a use state in which a to-be-moved object having an arbitrary shape is gripped by the robot hand according to the first embodiment shown in FIG. 1.
Figure 3:
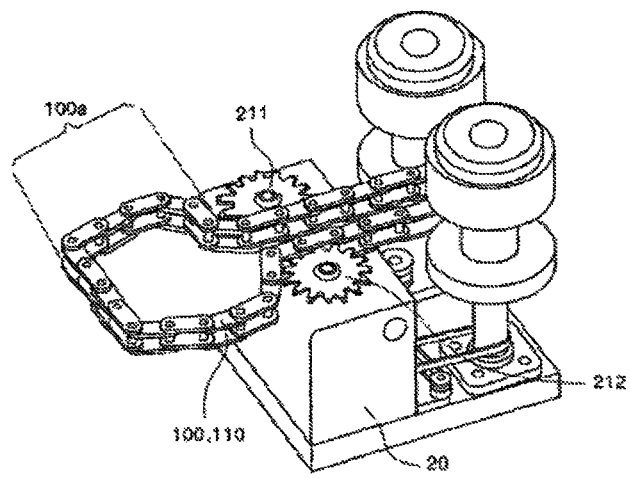
FIG. 3 is a perspective view illustrating a state in which the to-be-moved object is removed from the robot hand in FIG. 2.

FIGS. 1 to 3 are perspective views illustrating a robot hand according to a first embodiment of the resent invention, wherein FIG. 1 is a perspective view illustrating essential elements of a robot hand with a connection unit that is stretchably deformed in conformity with the shape of an object according to a first embodiment of the present invention, FIG. 2 is a perspective view illustrating a use state in which a to-be-moved object having an arbitrary shape is gripped by the robot hand according to the first embodiment shown in FIG. 1, and FIG. 3 is a perspective view illustrating a state in which the to-be-moved object is removed from the robot hand in FIG.

In the first embodiment of the robot hand according to the present invention, as shown in FIGS. 1 to 3, the variable connection device 100 has a structure that includes a bending deformation unit 110 consisting of a linear member such as a chain, a belt, or a wire, which can be flexibly deformed in its length and bending shape.

The connection length control device 200 is configured to include a first gear 211 rotatably mounted at one side of the bending deformation unit 110 in such a fashion as to be in close contact with the bending deformation unit 110, a second gear 212 rotatably mounted at the other side of the bending deformation unit 110 in such a fashion as to be in close contact with the bending deformation unit 110, and a power transmission assembly 213 configured to simultaneously drive the first gear 211 and the second gear 212 in the opposite direction by the rotation of the motor 201 in one direction.

The first gear 211 deforms the length or shape of the bending deformation unit 110 while moving one side of the bending deformation unit 110 by the rotation thereof, and the second gear 212 is rotated in the opposite direction to that of the first gear 211 by the power transmission assembly 213 and deforms the length or shape of the bending deformation unit 110 while moving the other side of the bending deformation unit 110 together with the first gear 211.

According to the first embodiment of the robot hand of the present invention, an operation is implemented in which the bending deformation unit 110 is moved inwardly of a housing 20 to decrease the length of the connection unit 100 as shown in FIG. 1 while simultaneously rotating the first gear 211 and the second gear 212 in the opposite direction to each other by using the power transmission assembly 213 through the rotation of the motor 201, or in which the bending deformation unit 110 is moved outwardly of the housing 20 to increase the length of the connection unit 100*a* while simultaneously rotating the first gear 211 and the second gear 212 in the direction opposite to that when the bending deformation unit 110 is moved inwardly of the housing 20.

Thus, in an open-loop state in which the bending deformation unit 110 is extended outwardly of the housing 20 to surround the circumference of the to-be-moved object 10, when the power transmission assembly 201 is driven in the closed-loop direction, the bending deformation unit 110 is flexibly bendably deformed naturally as shown in FIG. 3 in an arbitrary shape in which the bending deformation unit can be securely brought into close contact with the circumference of the to-be-moved object 10 having an arbitrary shape to maintain the to-be-moved object 10 in a state in which the to-be-moved object is gripped rigidly at a preset pressure as shown in FIG. 2.

Figure 4:
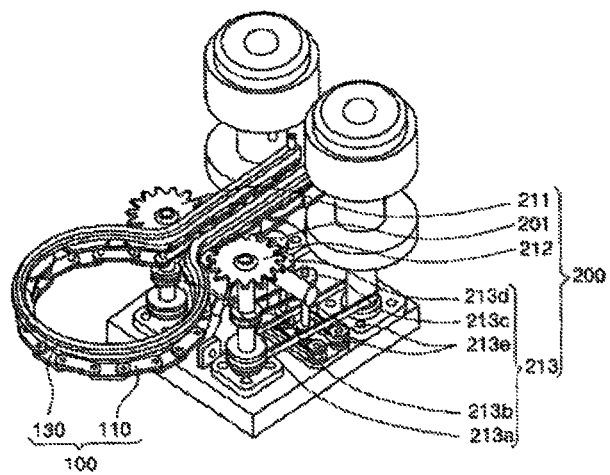
FIG. 4 is a perspective view illustrating essential elements of a robot hand with a connection unit that is stretchably deformed in conformity with the shape of an object according to a second embodiment of the present invention.
Figure 5:
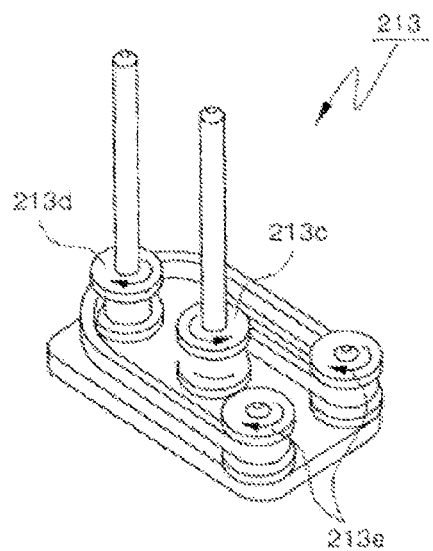
FIG. 5 is a perspective view illustrating essential elements of a power transmission assembly.

FIGS. 4 and 5 are perspective views illustrating a robot hand according to a second embodiment of the resent invention, wherein FIG. 4 is a perspective view illustrating essential elements of a robot hand with a connection unit that is stretchably deformed in conformity with the shape of an object according to a second embodiment of the present invention, and FIG. 5 is a perspective view illustrating essential elements of a power transmission assembly.

In the second embodiment of the robot hand according to the present invention, the variable connection device 100 additionally includes an airbag unit 130 formed of a tubular member which can be flexibly adjusted in volume by injection and discharge of air as shown in FIG. 4 unlike the robot hand according to the first embodiment of the present invention. The airbag unit 130 has a structure in which it is connectedly mounted on the bending deformation unit 110 so as to extend along the longitudinal direction of the bending deformation unit 110.

In the case where the surface of the to-be-moved object 10 is formed bendingly, the bending deformation unit 110 is brought into close contact with only a convexed surface of the to-be-moved object 10, so that it is difficult to be securely brought into pressurizing contact with a concaved surface of the to-be-moved object 10. In this case, when the volume of the airbag unit 30 is expanded by driving a driving unit such as a pneumatic pump, the airbag unit 30 made of a soft material is stretched up to the concaved surface portion of the to-be-moved object 10 so that it is brought into pressurizing contact with the concaved surface portion to cause the to-be-moved object to be more stably and rigidly gripped.

FIG. 5 shows essential elements of an example of the power transmission assembly 213 that is desirable to be applied to the robot hand according to the first and second embodiments of the present invention.

The power transmission assembly 213 includes a first main pulley 213*a* (see FIG. 4), a second main pulley 213*b* (see FIG. 4), a first auxiliary pulley 213*c*, a second auxiliary pulley 213*d*, and a pair of direction conversion pulleys 213*e*.

The first main pulley 213*a* is mounted coaxially with the first gear 211 and connected to the motor 201 by a belt member so as to be rotated in the same direction as the rotation direction of the motor 201, to cause the first gear 211 to be rotated in the same direction together with the motor 210.

The second main pulley 213*b* is mounted coaxially with the second gear 212. The first auxiliary pulley 213*c* is connected to the second main pulley 213*b* by a belt member so as to be rotated in the same direction as the rotation direction of the second main pulley 213*b*. The second auxiliary pulley 213*d* is connected to the motor 201 by a belt member so as to be rotated in the same direction as the rotation direction of the motor 201.

The pair of direction conversion pulleys 213e is mounted at a position opposed to the second auxiliary pulley 213d in such a fashion as to be connected to the first auxiliary pulley 213c and the second auxiliary pulley 213d by a belt member to cause the rotation of the second auxiliary pulley 213d to be transmitted to the first auxiliary pulley 213c in the reverse direction, so that the second gear 212 is rotated in the opposite direction to the rotation direction of the motor 201 by the cooperative rotation of the first auxiliary pulley 213c, the second auxiliary pulley 213d, and the pair of direction conversion pulleys 213e.

Figure 6:
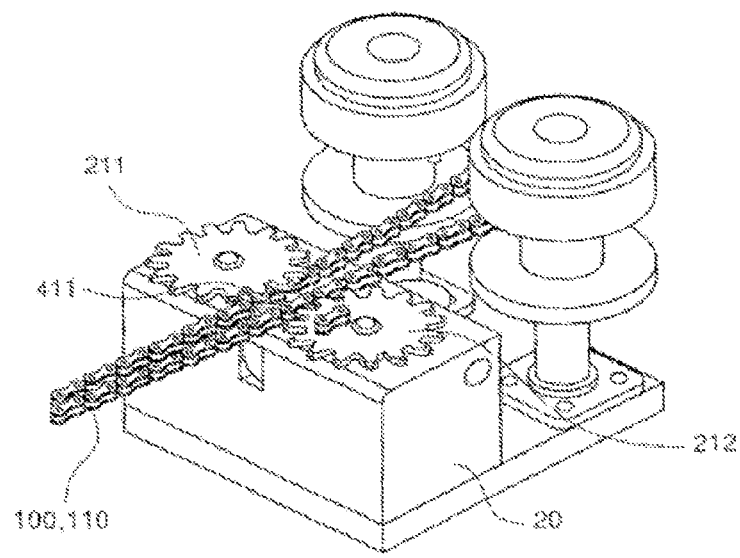
FIG. 6 is a perspective view illustrating essential elements of a robot hand with a connection unit that is stretchably deformed in conformity with the shape of an object according to a third embodiment of the present invention.
Figure 7:
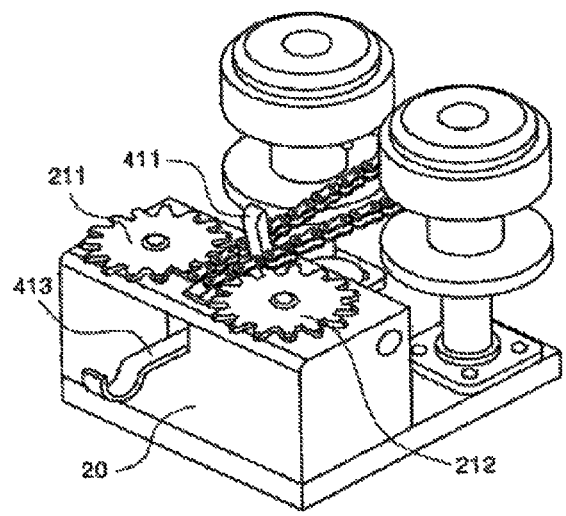
FIG. 7 is a perspective view illustrating essential elements of the robot hand in an operation state different from that in FIG. 6.
Figure 8:
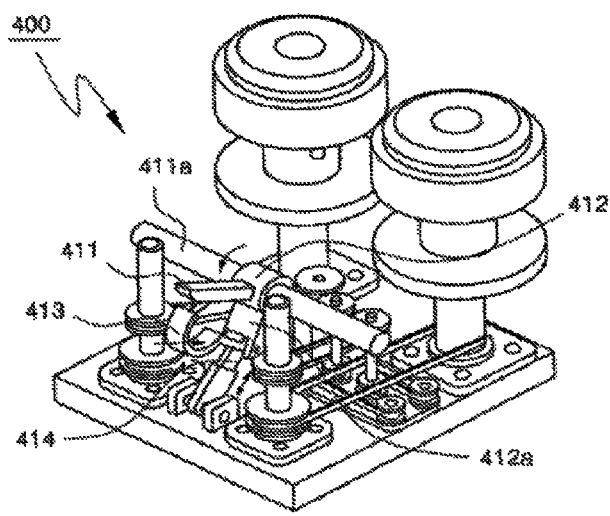
FIG. 8 is a perspective view illustrating essential elements of a hook device.
Figure 9:
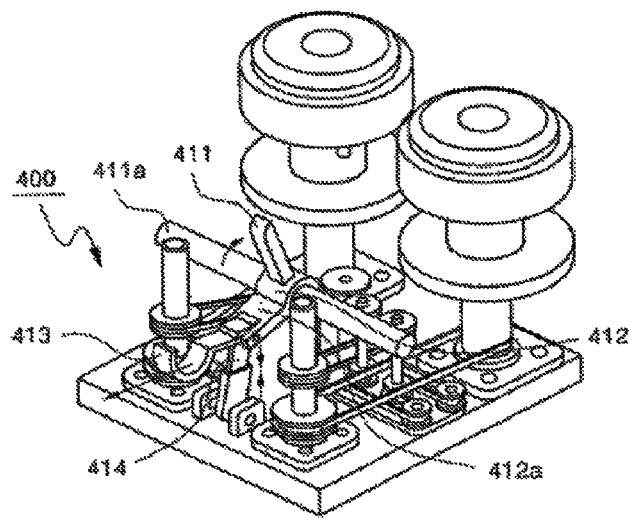
FIG. 9 is a perspective view illustrating essential elements of the hook device in an operation state different from that in FIG. 8.

FIGS. 6 to 9 are perspective views illustrating a robot hand according to a third embodiment of the resent invention, wherein FIG. 6 is a perspective view illustrating essential elements of a robot hand with a connection unit that is stretchably deformed in conformity with the shape of an object according to a third embodiment of the present invention, FIG. 7 is a perspective view illustrating essential elements of the robot hand in an operation state different from that in FIG. 6, FIG. 8 is a perspective view illustrating essential elements of a hook device, and FIG. 9 is a perspective view illustrating essential elements of the hook device in an operation state different from that in FIG. 8.

The robot hand according to the third embodiment of the present invention additionally includes a hook device 400 providing a hook that can be hooked on the to-be-moved object 10 using a ring member or a concaved portion groove formed on the to-be-moved object 10 in an open-loop state in which the connection unit 100a of the variable connection device is separated from the to-be-moved object 10 unlike the robot hand according to the first embodiment of the present invention.

As shown in FIGS. 8 and 9, the hook device 400 includes a driving force transmission unit 411, a hook linkage unit 412, a hook unit 413, and a stretchable support 414. In a state shown in FIG. 6, when the variable connection device 100 is deformed in shape or is moved, the driving force transmission unit 411 receives a pressure applied from the variable connection device 100 and is controlled in rotation, and the hook unit 413 is controlled in movement in the direction in which the hook unit 411 is spaced apart from a rotary shaft 411a of the driving force transmission unit by the rotation of the driving force transmission unit 411 and is controlled to be stretched in its length projecting to the to-be-moved object 10.

The hook linkage unit 412 includes a hook engagement unit 412a provided at a point having a constant relative angle to the driving force transmission unit 411 so that the hook unit 413 can be connectedly mounted on the hook engagement unit 412a, and is mounted on the rotary shaft 411a of the driving force transmission unit 411. Thus, the hook unit 413 maintains a constant relative angle to the driving force transmission unit 411 so that the cooperative operation of the hook unit 413 can be reliably controlled by the control of the variable connection device 100.

The stretchable support 414 is connected to at a top end thereof to the hook engagement unit 412a of the hook linkage unit 412 and includes a hook support configured to support a lower end of the hook unit 413 or pressurize an upper end of the hook unit 413 so that the stretchable support 414 is stretchably controlled to retain the shape of the hook unit 413 without the hook unit being sagged depending on the position of the hook engagement unit 412 as shown in FIGS. 8 and 9.

Figure 10:
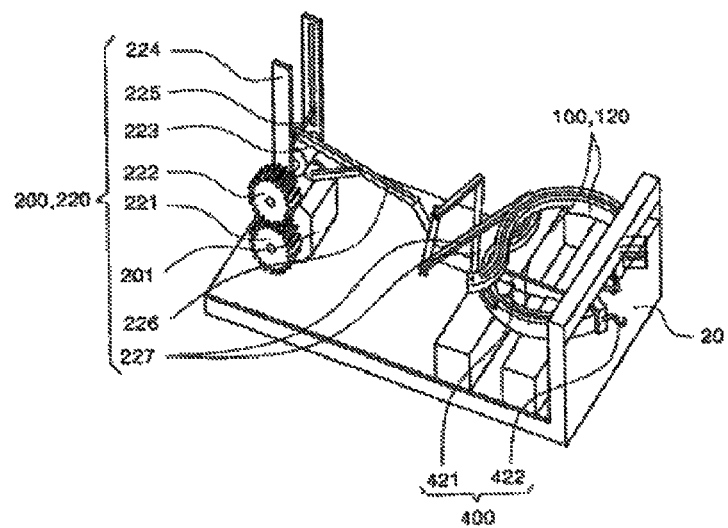
FIG. 10 is a perspective view illustrating essential elements of a robot hand with a connection unit that is stretchably deformed in conformity with the shape of an object according to a fourth embodiment of the present invention.
Figure 11:
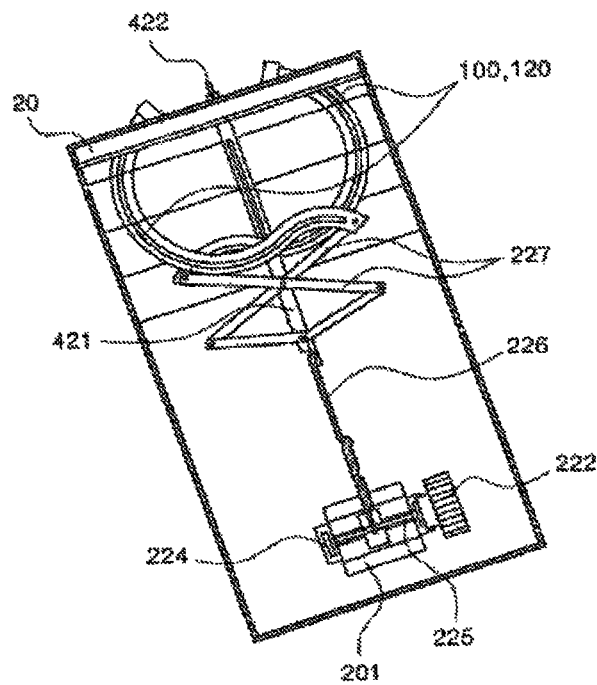
FIG. 11 is a top plan view of FIG. 10.

FIGS. 10 and 11 are views illustrating a robot hand according to a fourth embodiment of the resent invention, wherein FIG. 10 is a perspective view illustrating essential elements of a robot hand with a connection unit that is stretchably deformed in conformity with the shape of an object according to a fourth embodiment of the present invention, and FIG. 11 is a top plan view of FIG. 10.

In the fourth embodiment of the robot hand according to the present invention, the variable connection device 100 additionally includes a hand unit 120 configured to allow the connection unit 100a to vary in length by its position movement in the direction in which the hand unit approaches or moves away from the to-be-moved object 10 in a state of constantly retain the shape thereof, unlike the first embodiment of the robot hand according to the present invention.

The connection length control device 200 includes a linear-motion transmission unit 220 that linearly moves the hand unit 120 in the direction in which the hand unit 120 approaches or moves away from the to-be-moved object 10 in cooperation with the motor 20 (claim 9). The linear-motion transmission unit 220 includes a first power transmission gear 221, a second power transmission gear 222, a cam member (223), a pair of opposing supports 224, a vertically movable guide 225 (claim 11), a linearly movable bar 226, and a pair of left and right hand linkage bars 227.

The first power transmission gear 221 is mounted coaxially with the motor 201, the second power transmission gear 222 is connectedly mounted coaxially with the cam member 223 while being in circumferential contact with the first power transmission gear 221 to cause the cam member 223 to deceleratingly or acceleratingly rotate at a speed corresponding to a gear ratio between the first power transmission gear 221 and the second power transmission gear 222.

The cam member 223 is rotated in association with the motor 201 at a specified reduction gear ratio by the first power transmission gear 221 and the second power transmission gear 222 (claim 10), the pair of opposing supports 224 are vertically extendably mounted at a point where a rear end of the linearly movable bar 226 is positioned, the linearly movable bar 226 being linkingly connected at an intermediate portion thereof to the cam member.

The vertically movable guide 225 to which the rear end of the linearly movable bar 226 is hingedly coupled to cause the rear end of the linearly movable bar 226 to be moved along the supports 224 and which is configured to be horizontally mounted at guide slots of the supports 224 so as to be vertically movable along the guide slots. Thus, a front end of the linearly movable bar 226 is controlled to be forwardly or rearwardly moved by the rotation of the cam member 223 in a state in which the linearly movable bar 226 is linkingly connected at an intermediate portion thereof to the cam member.

The pair of left and right hand linkage bars 227 is connected at rear ends thereof to the front end of the linearly movable bar 226 and pivotally coupled at an intermediate portion thereof to one shaft, the left and right hand linkage bars crossing each other at the intermediate portion thereof, so that the front ends of the hand linkage bars vary in its position and angle by the movement of the linearly movable bar 226, the left and right hand linkage bars 227 being connected at the front ends thereof to the hand unit 120.

Accordingly, when the linearly movable bar 226 is moved forwardly in association with the cam member 223 by driving the motor 201 in one direction, as shown in FIGS. 10 and 11, the pair of hand linkage bars 227 coupled to the front end of the linearly movable bar 226 is folded such that the hand linkage bars 227 are reduced in a forwardly or rearwardly extending length thereof. At this time, the protruding length of the hand unit 120 to the outside of housing 20 is reduced, and simultaneously the spacing between end portions of the left and right hand units 120, which correspond to the connection unit 100*a*, is increased to enter an operation state of an open-loop mode.

On the other hand, when the motor 201 is driven reversely or the one-direction driving state of the motor 201 is continued to cause the linearly movable bar 226 to be rearwardly moved, the pair of hand linkage bars 227 coupled to the fronted of the linearly movable bar 226 is folded such that the hand linkage bars 227 are increased in a forwardly or rearwardly extending length thereof. At this time, the protruding length of the hand unit 120 to the outside of housing 20 is increased, and simultaneously the spacing between end portions of the left and right hand units 120, which correspond to the connection unit 100*a*, is reduced to enter an operation state of a closed-loop mode.

The hook device 400 includes a linear displacement transmission unit 421 and a linearly movable hook unit 422. The linear displacement transmission unit 421 is connected at a rear end thereof to the linearly movable bar 226 so as to be controlled to be moved in the opposite direction to the movement direction of the variable connection device 100. The linearly movable hook unit 422 is coupled to a front end of the linear displacement transmission unit 421 so as to be controlled in the protruding length of the linearly movable hook unit 422 to the to-be-moved object 10 by the movement of the linear displacement transmission unit 421.

Thus, when the linearly movable bar 226 is moved forwardly, the protruding length of the left and right hand units 120 to the outside of housing 20 is further reduced, but the protruding length of the linearly movable hook unit 422 of the hook device to the outside of the housing 20 is further increased. On the other hand, when the linearly movable bar 226 is moved rearwardly, the protruding length of the left and right hand units 120 to the outside of housing 20 is further increased, but the protruding length of the linearly movable hook unit 422 of the hook device to the outside of the housing 20 is further reduced.

Figure 12:
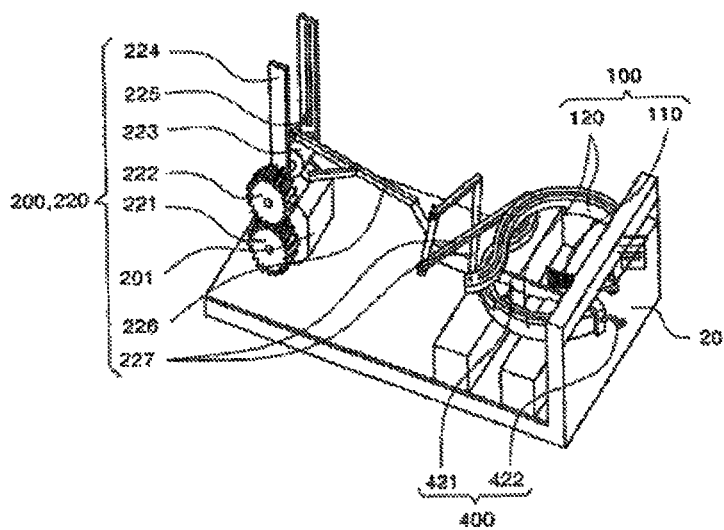
FIG. 12 is a perspective view illustrating essential elements of a robot hand with a connection unit that is stretchably deformed in conformity with the shape of an object according to a fifth embodiment of the present invention
Figure 13:
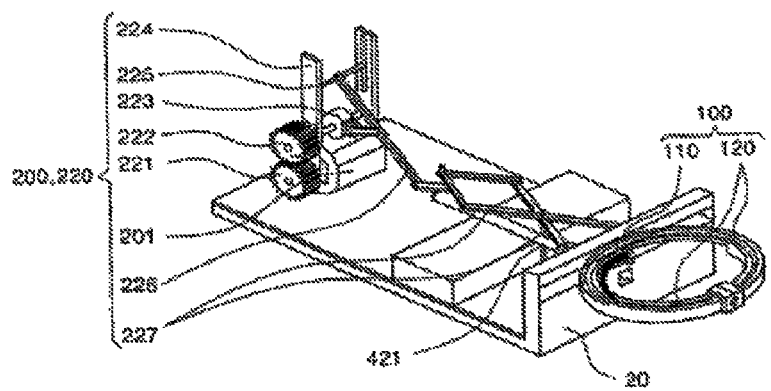
FIG. 13 is a perspective view illustrating essential elements of the robot hand in an operation state different from that in FIG. 12.

FIGS. 12 and 13 are views illustrating a robot hand according to a fifth embodiment of the resent invention, wherein FIG. 12 is a perspective view illustrating essential elements of a robot hand with a connection unit that is stretchably deformed in conformity with the shape of an object according to a fifth embodiment of the present invention, and FIG. 13 is a perspective view illustrating essential elements of the robot hand in an operation state different from that in FIG. 12.

In the fifth embodiment of the robot hand according to the present invention, the variable connection device 100 further includes a bending deformation unit 110 consisting of a linear member such as a chain, a belt, or a wire, which can be flexibly deformed in its length and bending shape, and coupled to at one end thereof to a front end of the hand unit 120 so as to vary in the contact state of the bending deformation unit 110 with the to-be-moved object 10 depending on the protruding length or position of the hand unit 120, unlike the fourth embodiment of the robot hand according to the present invention.

The bending deformation unit 110 is coupled at a front end thereof to a portion of one side of the left and right hand units 120, which corresponds the connection unit 100*a*, and is fixedly coupled at a rear end thereof to the housing 120. Thus, when the left and right hand units 120 is protruded to the outside of the housing 120 so that the connection unit 100*a* exceeds a specified length, the bending deformation unit 110 has a shape in which it extends along one side of the left and right hand units 120 so as to be opposed to the other side thereof.

The left and right hand units 120 is controlled in the spacing therebetween or the protruding length thereof to the outside of the housing 20 in a state of constantly retaining the shape thereof to cause the connection unit 100*a* to be deformed in length or shape. Thus, if the to-be-moved object 10 has a curved surface shape, the hand unit 120 is brought into close contact with only a portion corresponding to the outermost side of a protruded portion. In this case, if the bending deformation unit 110 is additionally provided between the left and right hand units 120, the bending state of the bending deformation unit 110 is deformed to adapt to the surface shape of the to-be-moved object 10, thereby stably gripping the to-be-moved object 10 with a more extended contact area.

Figure 14:
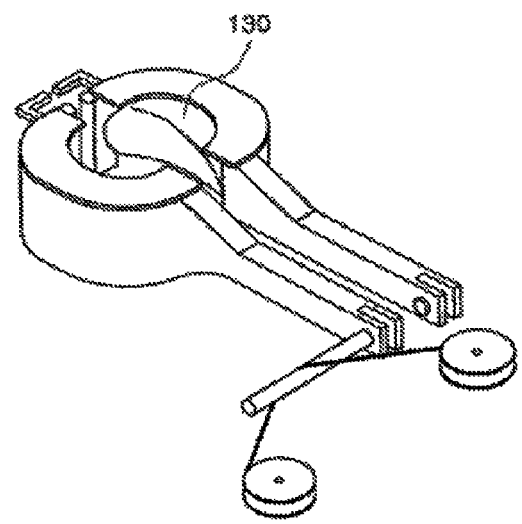
FIG. 14 is a perspective view illustrating essential elements of a robot hand with a connection unit that is stretchably deformed in conformity with the shape of an object according to a sixth embodiment of the present invention
Figure 15:
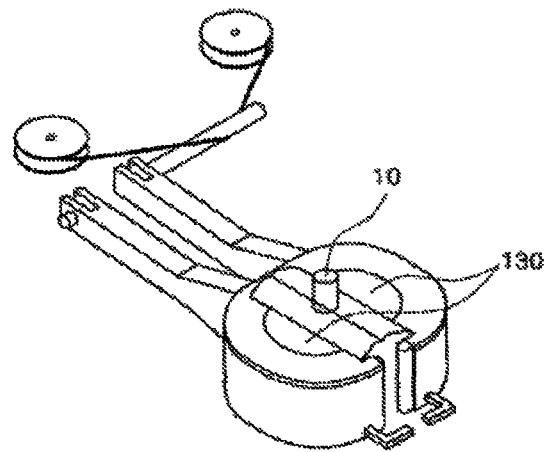
FIG. 15 is a perspective view illustrating a use state in which a to-be-moved object having an arbitrary shape is gripped by the robot hand according to the sixth embodiment shown in FIG. 14.
Figure 16:
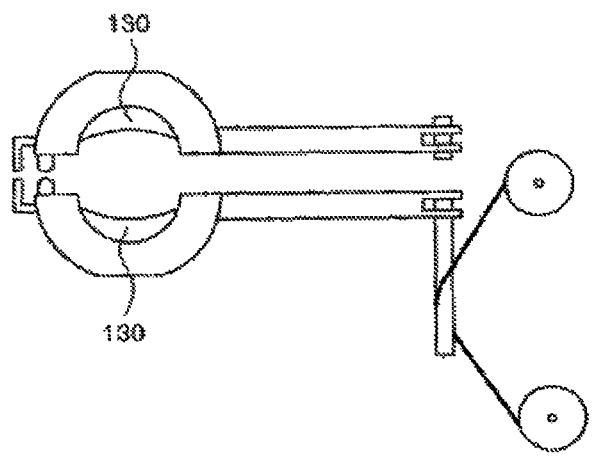
FIG. 16 is a top plan view of FIG. 14.
Figure 17:
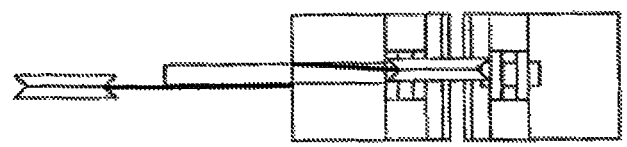
FIG. 17 is a side view of FIG. 14.
Figure 18:
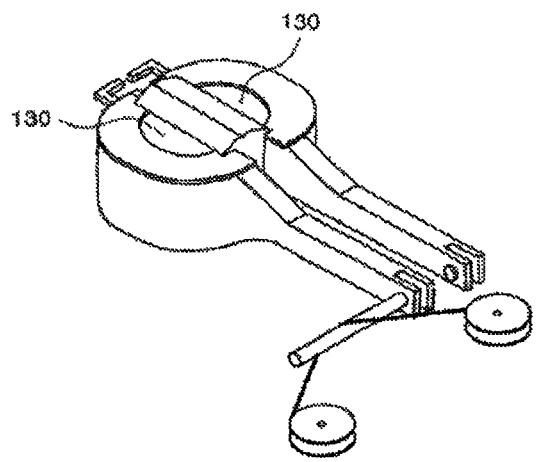
FIG. 18 is a perspective view illustrating essential elements of the robot hand in an operation state different from that in FIG. 14.
Figure 19:
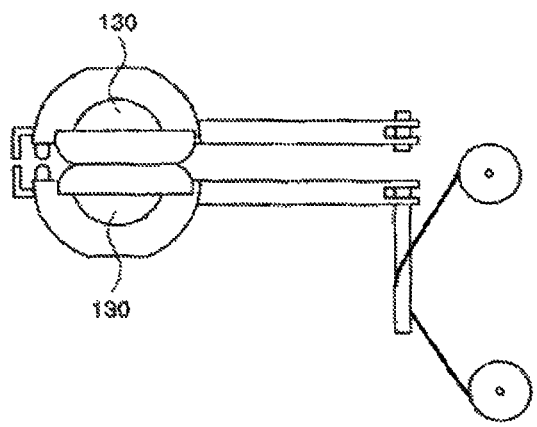
FIG. 19 is a top plan view of FIG. 18.
Figure 20:
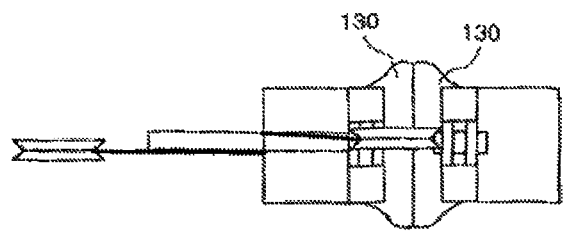
FIG. 20 is a side view of FIG. 18.

FIGS. 15 to 20 are views illustrating a robot hand according to a sixth embodiment of the resent invention, wherein FIG. 14 is a perspective view illustrating essential elements of a robot hand with a connection unit that is stretchably deformed in conformity with the shape of an object according to a sixth embodiment of the present invention, FIG. 15 is a perspective view illustrating a use state in which a to-be-moved object having an arbitrary shape is gripped by the robot hand according to the sixth embodiment shown in FIG. 14, FIG. 16 is a top plan view of FIG. 14, FIG. 17 is a side view of FIG. 14, FIG. 18 is a perspective view illustrating essential elements of the robot hand in an operation state different from that in FIG. 14, FIG. 19 is a top plan view of FIG. 18, and FIG. 20 is a side view of FIG. 18.

In the sixth embodiment of the robot hand according to the present invention, the connection unit 100*a* of the variable connection device includes a pair of left and right airbag units 130 each formed of a tubular member that is flexibly adjustable in volume by injection and discharge of air, unlike the first to fourth embodiments of the robot hand according to the present invention.

The connection unit 100*a* of the variable connection device is composed of the pair of left and right airbag units 130. Thus, when the volume of the airbag units 130 is expanded as shown in FIGS. 18 to 20 in a state in which the to-be-moved object 10 is disposed between the pair of left and right airbag units 130, although the to-be-moved object 10 has a small or complicated surface shape as shown in FIG. 14, the airbag units 130 made of a soft material are stretched up to the concaved surface portion of the to-be-moved object 10 so that it is brought into pressurizing contact with the concaved surface portion to cause the to-be-moved object to be more stably and rigidly gripped at a position spaced apart from the housing 20.

Next, a method for controlling the robot hand according to the present invention will be described hereinafter.

The robot hand control method according to the present invention is directed to a method for desirably controlling the robot hand in gripping and moving the to-be-moved object 10 using the robot hand with a connection unit that is stretchably deformed in conformity with the shape of an object according to the present invention. The robot hand control method includes a movement method selection step, a closed-loop switching step, and a preset pressure gripping step.

In the case where the robot hand does not include the hook device 400 as in the first, second and sixth embodiments of the robot hand according to the present invention, in the movement method selection step, whether application of a method of gripping and moving the to-be-moved object 10 is reasonable is determined based on information on the shape of the to-be-moved object 10 acquired through a sensor, or a determination result is inputted through an external input terminal.

If it is determined in the movement method selection step that the application of a method of gripping and moving the to-be-moved object 10 is reasonable or the determination result is inputted, the program proceeds to the closed-loop switching step where the operation mode of the robot hand is switched from an open-loop mode to a closed-loop mode in which a connection unit 100*a* of the variable connection device providing a contact face that can be brought into pressurizing contact with the to-be-moved object 10 comes into pressurizing contact with the surface of the to-be-moved object 10.

If the variable connection device 100 is brought into pressurizing contact with the to-be-moved object 10 at a preset pressure in a state in which the operation mode of the robot hand is switched from the open-loop mode to the closed-loop mode, the program proceeds to the preset pressure gripping step where the shape of the variable connection device 100 is constantly retained using the shape retention device.

In a state in which the variable connection device 100 is brought into pressurizing contact with the to-be-moved object 10 at the preset pressure, after the to-be-moved object 10 is gripped and is moved to a target position, the connection unit 100*a* of the variable connection device is separated from the to-be-moved object 10 so as to return to its initial state in an open-loop returning step in which the operation mode of the robot hand is switched from the closed-loop mode to the open-loop mode.

In the meantime, in the case where the robot hand includes the hook device 400 as in the third, fourth and fifth embodiments of the robot hand according to the present invention, preferably, the robot hand control method further includes a open-loop switching step and a hook providing step in addition to the movement method selection step, the closed-loop switching step, and the preset pressure gripping step.

In the movement method selection step, whether gripping the to-be-moved object 10 or using a hook is reasonable when moving the to-be-moved object 10 is determined based on information on the shape of the to-be-moved object 10 acquired through a sensor, or a determination result is inputted through an external input terminal.

If it is determined in the movement method selection step that gripping the to-be-moved object 10 is reasonable when moving the to-be-moved object 10 or the determination result is inputted, the program proceeds to the closed-loop switching step where the operation mode of the robot hand is switched from an open-loop mode to a closed-loop mode in which a connection unit 100*a* of the variable connection device providing a contact face that can be brought into pressurizing contact with the to-be-moved object 10 comes into pressurizing contact with the surface of the to-be-moved object 10.

On the other hand, if it is determined in the movement method selection step that using the hook is reasonable when moving the to-be-moved object 10 or the determination result is inputted, the program proceeds to the open-loop switching step where the operation mode of the robot hand is switched from the closed-loop mode to the open-loop mode in which the connection unit 100*a* of the variable connection device providing a contact face that can be brought into pressurizing contact with the to-be-moved object 10 is controlled to be separated from the to-be-moved object 10.

If the variable connection device 100 is brought into pressurizing contact with the to-be-moved object 10 at a preset pressure in a state in which the operation mode of the robot hand is switched from the open-loop mode to the closed-loop mode, the program proceeds to the preset pressure gripping step where the shape of the variable connection device 100 is constantly retained. Then, a hook is provided to be hooked on the to-be-moved object 10 using a ring member or a concaved portion groove formed on the to-be-moved object 10 in the hook providing step in a state in which the operation mode of the robot hand is switched from the closed-loop mode to the open-loop mode.

In the construction as in the fourth and fifth embodiments of the robot hand according to the present invention, the hook providing step is performed simultaneously with the operation in which the connection unit 100*a* of the variable connection device is separated from the to-be-moved object 10.

In the construction as in the first and second embodiments of the robot hand according to the present invention, the robot hand control method additionally includes a step of controlling the contact or connection state of the hook of the variable connection device 100 depending on the determination and inputting result in the movement method selection step to carry out the simultaneous performance as in the fourth and fifth embodiments of the present invention, or to control either the variable connection device 100 or the hook only to be moved independently.

The robot hand control method additionally includes a mode returning step in which after the to-be-moved object 10 is moved to a target position with it gripped or with the hook hooked on it, the current operation mode is switched from the open-loop mode to the closed-loop mode, or vice-versa.

Figure 21:
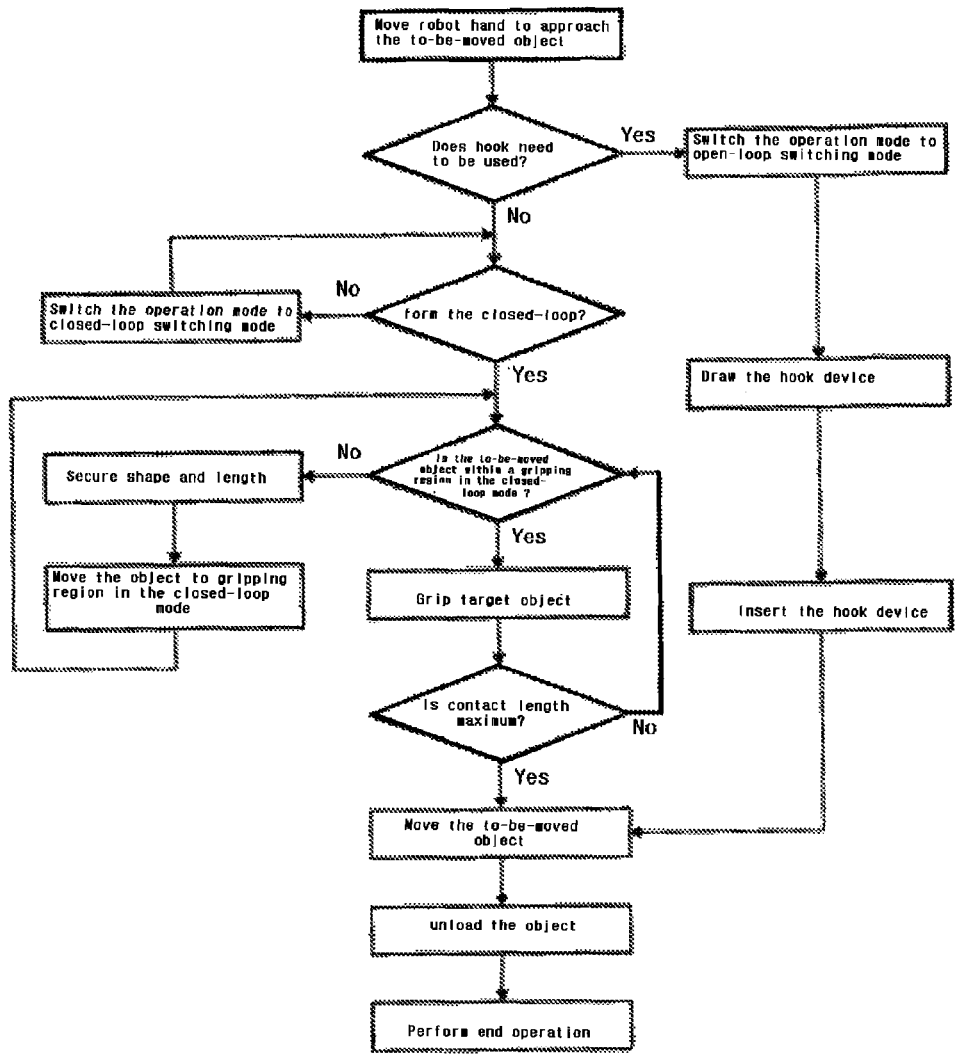
FIG. 21 is a flowchart illustrating a first embodiment of a robot hand control method according to the present invention.

FIG. 21 is a flowchart illustrating a first embodiment of a robot hand control method according to the present invention, which is suitable for its application to the case where the robot hand further includes the hook device 400 as in the third, fourth and fifth embodiments of the robot hand according to the present invention.

In a state in which the robot hand is moved to a position adjacent to the to-be-moved object 10, it is determined whether the use of the hook is reasonable in movement method selection step. If it is determined that the use of the hook is reasonable, the program proceeds to the open-loop switching step where the operation mode of the robot hand is switched from the closed-loop mode to the open-loop mode in which the variable connection device 100 is not used.

In the state in which operation mode of the robot hand is switched from the closed-loop mode to the open-loop mode, the program proceeds to the hook providing step where the hook device 400 is drawn from the housing 20 and hooked on the to-be-moved object 10, in which state the to-be-moved object 10 is moved to a target position. After the movement of the to-be-moved object 10 to the target position is completed, the program proceeds to the mode returning step where the hook device 400 is released from the hooked state, thereby stably implementing the operation of moving the to-be-moved object 10 while gripping it.

On the other hand, if it is determined in the movement method selection step that the use of the hook is not reasonable, the program proceeds to the closed-loop switching step where the operation mode of the robot hand is switched from the open-loop mode to the closed-loop mode in which the variable connection device 100 is used to perform a basically preset gripping operation.

In the state in which operation mode of the robot hand is switched from the open-loop mode to the closed-loop mode, it is confirmed whether the variable connection device 100 is placed within a region where the to-be-moved object 10 can be gripped using the variable connection device 100. If it is determined that the variable connection device 100 is placed not within the region where the to-be-moved object 10 can be gripped, the connection length control device 200 is driven to stretchably deform or move the variable connection device 100 in the form suitable for securing the region where the to-be-moved object 10 is easy to grip, and the variable connection device 100 is controlled to be placed within the region where the to-be-moved object 10 can be gripped.

In a state in which the variable connection device 100 is placed within the region where the to-be-moved object 10 can be gripped, the connection length control device 200 is driven to cause variable connection device 100 to grip the surface of the to-be-moved object 10. Then, if the variable connection device 100 is brought into pressurizing contact the to-be-moved object 10 at a preset pressure with the possible maximum contact length or contact area, the to-be-moved object 10 is moved to the target position while the operation factors such as the shape and the driving transmission force of the variable connection device 100 are maintained as they are.

According to the robot hand with a connection unit that is stretchably deformed in conformity with the shape of an object according to the present invention and a method for controlling the same, among various operations which are not performed by a conventional robot hand, an operation of gripping the to-be-moved object 10 having an arbitrary shape when moving the to-be-moved object 10 can be reliably and stably implemented by a simple structure including a variable connection device 100 configured to provide a contact face that can be brought into pressurizing contact with a to-be-moved object 10, a connection length controller 200 configured to stretchably deform the shape of the variable connection device, and a shape retention device configured to constantly maintain the state in which the variable connection device 100 is brought into pressurizing contact with the to-be-moved object 10 at a preset pressure.

In addition, since the variable connection device 100 has a structure in which the connection unit 100a is stretchably deformed so as to be in close contact with the to-be-moved object 10, the operation of gripping the object to move the object is enabled only by a minimum control of deforming the length or shape of the variable connection device 100, so that the operation reliability according to the mechanical driving and the ridigity capable of stably transmitting and maintaining a driving force can be secured.

Further, the compactness and lightness of the robot hand can be implemented by a simpler structure that at least includes only a driving unit and a sensor required to move the to-be-moved object 10 while griping the to-be-moved object. Moreover, since the variable connection device 100 of a simple structure is stretchably deformed consistently by the analyzing minimum information inputted from a small quantity of sensors, a control system for operating the sensors and the motor on an association basis can be also simplified, thereby implementing a more stable control system.

While the present invention has been described with reference to the preferred embodiments of the present invention, it will be apparent to a person of ordinary skill in the art that the present invention is not intended to be limited to these embodiments, but along with an embodiment in which the above embodiments and an existing known art are merely combined, technical ideas deformed and used by a person of ordinary skill in the art based on the detailed description and the appended claims of the present invention should be construed to fall within the scope of the present invention.

The invention claimed is:

1. A robot hand with a connection unit that is stretchably deformed in conformity with the shape of an object, the robot hand comprising:

a variable connection device including a connection unit configured to provide a contact face that can be brought into pressurizing contact with a to-be-moved object and configured to be stretchably deformed so as to be in close contact with the to-be-moved object;

a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and a shape retention device configured to constantly retain the shape of the variable connection device in the closed-loop state in which the variable connection device is brought into pressurizing contact with the to-be-moved object at a preset pressure, wherein the variable connection device comprises a hand unit configured to allow the connection unit to vary in length by its position movement in the direction in which the hand unit approaches or moves away from the to-be-moved object in a state of constantly retain the shape thereof.

2. The robot hand according to claim 1, wherein the variable connection device comprises a bending deformation unit consisting of a linear member including a chain, a belt, or a wire, which can be flexibly deformed in its length and bending shape.

3. The robot hand according to claim 2, wherein the variable connection device further comprises an airbag unit formed of a tubular member that is flexibly adjustable in volume by injection and discharge of air, and configured to be connectedly mounted on the bending deformation unit so as to extend along the longitudinal direction of the bending deformation unit.

4. The robot hand according to claim 1, wherein the variable connection device further comprises a bending deformation unit consisting of a linear member including a chain, a belt, or a wire, which can be flexibly deformed in its length and bending shape, and coupled to at one end thereof to a front end of the hand unit so as to vary in the contact state of the bending deformation unit with the to-be-moved object depending on the protruding length or position of the hand unit.

5. The robot hand according to claim 4, wherein the connection length control device comprises a linear-motion transmission unit configured to linearly move the hand unit in the direction in which the hand unit approaches or moves away from the to-be-moved object in association with the motor.

6. The robot hand according to claim 5, wherein the linear-motion transmission unit comprises: a cam member configured to be rotated in association with the motor; a linearly movable bar configured to be linkingly connected to the cam member so that a front end of the linearly movable bar is controlled to be forwardly or rearwardly moved by the rotation of the cam member and a pair of left and right hand linkage bars configured to be connected at rear ends thereof to the front end of the linearly movable bar and pivotally coupled at an intermediate portion thereof to one shaft, the left and right hand linkage bars crossing each other at the intermediate portion thereof, so that the front ends of the hand linkage bars vary in its position and angle by the movement of the linearly movable bar, the left and right hand linkage bars being connected at the front ends thereof to the hand unit.

7. The robot hand according to claim 6, wherein the linear-motion transmission unit further comprises: a first power transmission gear configured to be mounted coaxially with the motor; a second power transmission gear configured to be connectedly mounted coaxially with the cam member while being in circumferential contact with the first power transmission gear to cause the cam member to deceleratingly or acceleratingly rotate at a speed corresponding to a gear ratio between the first power transmission gear and the second power transmission gear; a pair of opposing support vertically extendably mounted at a point where a rear end of the linearly movable bar is positioned, the linearly movable bar being linkingly connected at an intermediate portion thereof to the cam member; and a vertically movable guide to which the rear end of the linearly movable bar is hingedly coupled to cause the rear end of the linearly movable bar to be moved along the supports and which is configured to be horizontally mounted at guide slots of the supports so as to be vertically movable along the guide slots.

8. The robot hand according to claim 4, further comprising a hook device providing a hook that can be hooked on the to-be-moved object using a ring member or a concaved portion groove formed on the to-be-moved object in an open-loop state in which the connection unit of the variable connection device is separated from the to-be-moved object.

9. The robot hand according to claim 8, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

10. The robot hand according to claim 9, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

11. The robot hand according to claim 8, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

12. The robot hand according to claim 1, wherein the variable connection device includes an airbag unit formed of a tubular member that is flexibly adjustable in volume by injection and discharge of air.

13. The robot hand according to claim 1, wherein the shape retention device comprises a shape retention control unit that controls the operation of the connection length control device so that when the variable connection device is subjected to a load exceeding a threshold value, it is maintained in its finally deformed state.

14. The robot hand according to claim 1, wherein the connection length control device comprises a linear-motion transmission unit configured to linearly move the hand unit in the direction in which the hand unit approaches or moves away from the to-be-moved object in association with the motor.

15. The robot hand according to claim 14, wherein the linear-motion transmission unit comprises: a cam member configured to be rotated in association with the motor; a linearly movable bar configured to be linkingly connected to the cam member so that a front end of the linearly movable bar is controlled to be forwardly or rearwardly moved by the rotation of the cam member and a pair of left and right hand linkage bars configured to be connected at rear ends thereof to the front end of the linearly movable bar and pivotally coupled at an intermediate portion thereof to one shaft, the left and right hand linkage bars crossing each other at the intermediate portion thereof, so that the front ends of the hand linkage bars vary in its position and angle by the movement of the linearly movable bar, the left and right hand linkage bars being connected at the front ends thereof to the hand unit.

16. The robot hand according to claim 15, wherein the linear-motion transmission unit further comprises: a first power transmission gear configured to be mounted coaxially with the motor; a second power transmission gear configured to be connectedly mounted coaxially with the cam member while being in circumferential contact with the first power transmission gear to cause the cam member to deceleratingly or acceleratingly rotate at a speed corresponding to a gear ratio between the first power transmission gear and the second power transmission gear; a pair of opposing support vertically extendably mounted at a point where a rear end of the linearly movable bar is positioned, the linearly movable bar being linkingly connected at an intermediate portion thereof to the cam member; and a vertically movable guide to which the rear end of the linearly movable bar is hingedly coupled to cause the rear end of the linearly movable bar to be moved along the supports and which is configured to be horizontally mounted at guide slots of the supports so as to be vertically movable along the guide slots.

17. The robot hand according to claim 1, further comprising a hook device providing a hook that can be hooked on the to-be-moved object using a ring member or a concaved portion groove formed on the to-be-moved object in an open-loop state in which the connection unit of the variable connection device is separated from the to-be-moved object.

18. The robot hand according to claim 17, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

19. The robot hand according to claim 18, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

20. The robot hand according to claim 17, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

21. A robot hand with a connection unit that is stretchably deformed in conformity with the shape of an object, the robot hand comprising:
a variable connection device including a connection unit configured to provide a contact face that can be brought into pressurizing contact with a to-be-moved object and configured to be stretchably deformed so as to be in close contact with the to-be-moved object;
a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and
a shape retention device configured to constantly retain the shape of the variable connection device in the closed-loop state in which the variable connection device is brought into pressurizing contact with the to-be-moved object at a preset pressure,
wherein the variable connection device comprises a bending deformation unit consisting of a linear member including a chain, a belt, or a wire, which can be flexibly deformed in its length and bending shape,
wherein the variable connection device further comprises an airbag unit formed of a tubular member that is flexibly adjustable in volume by injection and discharge of air, and configured to be connectedly mounted on the bending deformation unit so as to extend along the longitudinal direction of the bending deformation unit, and
wherein the connection length control device comprises: a first gear rotatably mounted at one side of the bending deformation unit in such a fashion as to be in close contact with the bending deformation unit, the first gear being configured to deforms the length or shape of the bending deformation unit while moving one side of the bending deformation unit by the rotation thereof; a second gear rotatably mounted at the other side of the bending deformation unit in such a fashion as to be in close contact with the bending deformation unit, the second gear being configured to be rotated in the opposite direction to that of the first gear and to deform the length or shape of the bending deformation unit while moving the other side of the bending deformation unit together with the first gear; and a power transmission assembly configured to simultaneously drive the first gear and the second gear in the opposite direction by the rotation of the motor in one direction.

22. The robot hand according to claim 21, wherein the power transmission assembly comprises: a first main pulley mounted coaxially with the first gear and connected to the motor by a belt member so as to be rotated in the same direction as the rotation direction of the motor; a second main pulley mounted coaxially with the second gear; a first auxiliary pulley connected to the second main pulley by a belt member so as to be rotated in the same direction as the rotation direction of the second main pulley; a second auxiliary pulley connected to the motor by a belt member so as to be rotated in the same direction as the rotation direction of the motor; and a pair of direction conversion pulleys mounted at a position opposed to the second auxiliary pulley in such a fashion as to be connected to the first auxiliary pulley and the second auxiliary pulley by a belt member to cause the rotation of the second auxiliary pulley to be transmitted to the first auxiliary pulley in the reverse direction.

23. A robot hand with a connection unit that is stretchably deformed in conformity with the shape of an object, the robot hand comprising:
a variable connection device including a connection unit configured to provide a contact face that can be brought into pressurizing contact with a to-be-moved object and configured to be stretchably deformed so as to be in close contact with the to-be-moved object;
a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and
a shape retention device configured to constantly retain the shape of the variable connection device in the closed-loop state in which the variable connection device is brought into pressurizing contact with the to-be-moved object at a preset pressure,
wherein the variable connection device includes an airbag unit formed of a tubular member that is flexibly adjustable in volume by injection and discharge of air, and
wherein the robot hand further comprises a hook device providing a hook that can be hooked on the to-be-moved object using a ring member or a concaved portion groove formed on the to-be-moved object in an open-loop state in which the connection unit of the variable connection device is separated from the to-be-moved object.

24. The robot hand according to claim 23, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

25. The robot hand according to claim 24, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

26. The robot hand according to claim 23, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

27. A method for controlling a robot hand, the method comprising: a movement method selection step in which, when moving a to-be-moved object, whether to grip the to-be-moved object or to use a hook is is determined based on information on the shape of the to-be-moved object acquired through a sensor, or a determination result is inputted through an external input terminal; a closed-loop switching step where if it is determined in the movement method selection step to grip the to-be-moved object or the determination result is inputted, the operation mode of the robot hand is switched from an open-loop mode to a closed-loop mode in which a connection unit of the variable connection device providing a contact face that can be brought into pressurizing contact with the to-be-moved object comes into pressurizing contact with the surface of the to-be-moved object; a preset pressure gripping step in which if the variable connection device is brought into pressurizing contact with the to-be-moved object at a preset pressure in a state in which the operation mode of the robot hand is switched from the open-loop mode to the closed-loop mode, the shape of the variable connection device is constantly retained; an open-loop switching step in which if it is determined in the movement method selection step to use the hook or the determination result is inputted, the operation mode of the robot hand is switched from the closed-loop mode to the open-loop mode in which the connection unit of the variable connection device providing a contact face that can be brought into pressurizing contact with the to-be-moved object is controlled to be separated from the to-be-moved object; and a hook providing step in which a hook is provided so that the hook is hooked on the to-be-moved object using a ring member or a concaved portion groove formed on the to-be-moved object in a state in which the operation mode of the robot hand is switched from the closed-loop mode to the open-loop mode.

28. The method according to claim 27, wherein the hook providing step is performed simultaneously with the operation in which the connection unit of the variable connection device is separated from the to-be-moved object.

29. A robot hand with a connection unit that is stretchably deformed in conformity with the shape of an object, the robot hand comprising:
a variable connection device including a connection unit configured to provide a contact face that can be brought into pressurizing contact with a to-be-moved object and configured to be stretchably deformed so as to be in close contact with the to-be-moved object;
a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and
a shape retention device configured to constantly retain the shape of the variable connection device in the closed-loop state in which the variable connection device is brought into pressurizing contact with the to-be-moved object at a preset pressure,
wherein the variable connection device comprises a bending deformation unit consisting of a linear member including a chain, a belt, or a wire, which can be flexibly deformed in its length and bending shape, and
wherein the connection length control device comprises: a first gear rotatably mounted at one side of the bending deformation unit in such a fashion as to be in close contact with the bending deformation unit, the first gear being configured to deforms the length or shape of the bending deformation unit while moving one side of the bending deformation unit by the rotation thereof; a second gear rotatably mounted at the other side of the bending deformation unit in such a fashion as to be in close contact with the bending deformation unit, the second gear being configured to be rotated in the opposite direction to that of the first gear and to deform the length or shape of the bending deformation unit while moving the other side of the bending deformation unit together with the first gear; and a power transmission assembly configured to simultaneously drive the first gear and the second gear in the opposite direction by the rotation of the motor in one direction.

30. The robot hand according to claim 29, wherein the power transmission assembly comprises: a first main pulley mounted coaxially with the first gear and connected to the motor by a belt member so as to be rotated in the same direction as the rotation direction of the motor; a second main pulley mounted coaxially with the second gear; a first auxiliary pulley connected to the second main pulley by a belt member so as to be rotated in the same direction as the rotation direction of the second main pulley; a second auxiliary pulley connected to the motor by a belt member so as to be rotated in the same direction as the rotation direction of the motor; and a pair of direction conversion pulleys mounted at a position opposed to the second auxiliary pulley in such a fashion as to be connected to the first auxiliary pulley and the second auxiliary pulley by a belt member to cause the rotation of the second auxiliary pulley to be transmitted to the first auxiliary pulley in the reverse direction.

31. A robot hand with a connection unit that is stretchably deformed in conformity with the shape of an object, the robot hand comprising:
a variable connection device including a connection unit configured to provide a contact face that can be brought into pressurizing contact with a to-be-moved object and configured to be stretchably deformed so as to be in close contact with the to-be-moved object;

a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and a shape retention device configured to constantly retain the shape of the variable connection device in the closed-loop state in which the variable connection device is brought into pressurizing contact with the to-be-moved object at a preset pressure, wherein the variable connection device comprises a bending deformation unit consisting of a linear member including a chain, a belt, or a wire, which can be flexibly deformed in its length and bending shape, wherein the variable connection device further comprises an airbag unit formed of a tubular member that is flexibly adjustable in volume by injection and discharge of air, and configured to be connectedly mounted on the bending deformation unit so as to extend along the longitudinal direction of the bending deformation unit, and wherein the robot hand further comprises a hook device providing a hook that can be hooked on the to-be-moved object using a ring member or a concaved portion groove formed on the to-be-moved object in an open-loop state in which the connection unit of the variable connection device is separated from the to-be-moved object.

32. The robot hand according to claim 31, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

33. The robot hand according to claim 32, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

34. The robot hand according to claim 31, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

35. A robot hand with a connection unit that is stretchably deformed in conformity with the shape of an object, the robot hand comprising:

a variable connection device including a connection unit configured to provide a contact face that can be brought into pressurizing contact with a to-be-moved object and configured to be stretchably deformed so as to be in close contact with the to-be-moved object;

a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object; and a shape retention device configured to constantly retain the shape of the variable connection device in the closed-loop state in which the variable connection device is brought into pressurizing contact with the to-be-moved object at a preset pressure, wherein the variable connection device comprises a bending deformation unit consisting of a linear member including a chain, a belt, or a wire, which can be flexibly deformed in its length and bending shape, and wherein the robot hand further comprises a hook device providing a hook that can be hooked on the to-be-moved object using a ring member or a concaved portion groove formed on the to-be-moved object in an open-loop state in which the connection unit of the variable connection device is separated from the to-be-moved object.

36. The robot hand according to claim 35, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

37. The robot hand according to claim 36, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

38. The robot hand according to claim 35, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

39. A robot hand with a connection unit that is stretchably deformed in conformity with the shape of an object, the robot hand comprising:
- a variable connection device including a connection unit configured to provide a contact face that can be brought into pressurizing contact with a to-be-moved object and configured to be stretchably deformed so as to be in close contact with the to-be-moved object;
- a connection length controller configured to be operated in cooperation with a driving unit including a motor or a pump to stretchably deform the connection unit of the variable connection device so that the connection unit of the variable connection device undergoes a switch between a closed-loop state in which the connection unit is brought into pressurizing contact with an outer surface of the to-be-moved object either continuously or divided into a plurality of segments, and an open-loop state in which the connection unit is separated from the to-be-moved object;
- a shape retention device configured to constantly retain the shape of the variable connection device in the closed-loop state in which the variable connection device is brought into pressurizing contact with the to-be-moved object at a preset pressure; and
- a hook device providing a hook that can be hooked on the to-be-moved object using a ring member or a concaved portion groove formed on the to-be-moved object in an open-loop state in which the connection unit of the variable connection device is separated from the to-be-moved object.

40. The robot hand according to claim 39, wherein the hook device comprises: a driving force transmission unit configured to receive a pressure applied from the variable connection device and to be controlled in rotation by deformation of the shape and movement of the variable connection device; and a hook unit configured to be controlled in movement in the direction in which the hook unit is spaced apart from a rotary shaft of the driving force transmission unit in response to the rotation of the driving force transmission unit and configured to be controlled to be stretched in its length projecting to the to-be-moved object.

41. The robot hand according to claim 40, wherein the hook device comprises: a hook linkage unit including a hook engagement unit provided at a point having a constant relative angle to the driving force transmission unit so that the hook unit can be connectedly mounted on the hook engagement unit, the hook unit being mounted on the rotary shaft of the driving force transmission unit; and a stretchable support connected to at a top end thereof to the hook engagement unit of the hook linkage unit and including a hook support configured to support a lower end of the hook unit or pressurize an upper end of the hook unit so that the stretchable support is stretchably controlled depending on the position of the hook engagement unit to retain the shape of the hook unit without the hook unit being sagged.

42. The robot hand according to claim 39, wherein the hook device comprises: a linear displacement transmission unit connected at a rear end thereof to the linearly movable bar so as to be controlled to be moved in the opposite direction to the movement direction of the variable connection device; and a linearly movable hook unit is coupled to a front end of the linear displacement transmission unit so as to be controlled in the protruding length of the linearly movable hook unit to the to-be-moved object by the movement of the linear displacement transmission unit.

\* \* \* \* \*